US007013347B1

(12) United States Patent
Moen

(10) Patent No.: US 7,013,347 B1
(45) Date of Patent: Mar. 14, 2006

(54) DISTANCE VECTOR EXTENSION TO THE ADDRESS RESOLUTION PROTOCOL

(75) Inventor: Daniel Moen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 823 days.

(21) Appl. No.: 09/981,181

(22) Filed: Oct. 16, 2001

(51) Int. Cl.
*G06F 15/173* (2006.01)

(52) U.S. Cl. ...................... 709/238; 709/239; 709/240; 709/241; 709/242; 709/243; 709/244; 370/395.54; 370/395.31; 370/401; 370/238; 370/469; 370/470; 370/471

(58) Field of Classification Search ........ 709/238–244; 370/395, 395.54, 395.31, 401, 238, 469–473
See application file for complete search history.

(56) References Cited

U.S. PATENT DOCUMENTS 5,309,437 A * 5/1994 Perlman et al. ............. 370/401
5,590,118 A * 12/1996 Nederlof ..................... 370/218
5,649,109 A * 7/1997 Griesmer et al. ........... 709/242
5,761,435 A * 6/1998 Fukuda et al. ............. 709/238
5,828,665 A * 10/1998 Husak ................... 370/395.53
6,006,275 A * 12/1999 Picazo et al. ............... 709/249
6,032,194 A * 2/2000 Gai et al. ................... 709/239
6,044,087 A * 3/2000 Muller et al. ............... 370/463
6,205,146 B1 * 3/2001 Rochberger et al. ... 370/395.53
6,304,913 B1 * 10/2001 Rune .......................... 709/241
6,347,078 B1 * 2/2002 Narvaez-Guarnieri et al. ... 370/230
6,501,754 B1 * 12/2002 Ohba et al. ................. 370/389
6,526,056 B1 * 2/2003 Rekhter et al. ............. 370/392
6,535,490 B1 * 3/2003 Jain ........................... 370/256
6,556,541 B1 * 4/2003 Bare .......................... 370/235
6,597,663 B1 * 7/2003 Rekhter ...................... 370/252
6,646,989 B1 * 11/2003 Khotimsky et al. ......... 370/238
6,693,991 B1 * 2/2004 Yi ........................... 379/22.01
6,697,339 B1 * 2/2004 Jain ........................... 370/256

* cited by examiner

*Primary Examiner*—Saleh Najjar
*Assistant Examiner*—Shawki Saif Ismail

(57) ABSTRACT

A method and device thereof for managing messages received at a bridging device. A bridging device receives a first message comprising a first contact information and a first distance vector representing a first number of hops the first message has traversed. The first distance vector is compared to a stored second distance vector corresponding to a stored second contact information for the remote electronic device, wherein the second contact information and second distance vector are provided by a second message. The second distance vector represents a second number of hops the second message has traversed. Provided the first number of hops is greater than the second number of hops, the first message is discarded. Alternatively, provided the first number of hops is not greater than the second number of hops, the second contact information and second distance vector are discarded and the first contact information and first distance vector are stored on a computer-readable memory of the bridging device. The present invention provides a method and device thereof for filtering out repeat traffic at a bridging device without requiring additional messaging.

27 Claims, 5 Drawing Sheets

DISTANCE VECTOR EXTENSION TO THE ADDRESS RESOLUTION PROTOCOL

FIELD OF INVENTION

The present invention relates to the field of computer networks. Specifically, the present invention relates to a distance vector address resolution protocol for use in a bridging device.

BACKGROUND OF THE INVENTION

To expand the number of size of subnets, bridging devices are often used. Any time two or more layer two devices (e.g., bridging devices) are bridging a subnet across the same link (e.g., in a redundant configuration), there exists the possibility of introducing a bridging loop. For example, consider the case where two bridging devices are both performing address resolution protocol (ARP) requests for an unknown address. Upon receipt of the request on one interface, the default behavior will be to repeat this request as a broadcast to the other side. However, the other bridging device will then receive the request and repeat it back on the original segment, causing a bridge loop that must be intercepted.

Another problem with utilizing a plurality of bridging devices to bridge a subnet is handling ARP responses. Whenever a second device bridges the same subnet as a bridge that is repeating ARP traffic, it will receive the ARP response on both sides of the subnet. Furthermore, the response will typically be received first on the correct side, and then on the repeated side. Learning the location of the device by receiving these ARP requests will usually result in storing the incorrect state. Currently, there is no standardized way of resolving this problem.

The bridge loop has been prevented in the past by detecting the other devices and not doing proxy ARP for these devices, and by maintaining state about pending requests to prevent re-broadcast of identical ARP requests.

Incorrect bridge learning from repeated ARP traffic has been prevented in the past by using proxy ARP (substituting the bridge's MAC address for the original device's MAC), and then learning which devices are proxy devices, and ignoring proxy responses when other responses are also being received. Some devices use a proprietary protocol to communicate state about the bridging table to solve this problem. Both of these previous solutions have disadvantages, however, ranging from connectivity outage when a device is moved, to extra network traffic. In addition, these solutions preclude a bridging device from doing repeat (non-proxy) traffic in a redundant configuration.

Accordingly, a need exists for a method and device for detection of bridge loops in the case of ARP. A need also exists for a method and device that accomplishes the above need and for determining which of two proxy devices to use to reach a device in the shortest number of hops. A need also exists for a method and device that accomplishes the above needs and for determining whether or not to respond to an ARP request. A need also exists for a method and device that accomplishes the above needs and for filtering out repeat traffic without requiring additional messaging.

SUMMARY OF THE INVENTION

The present invention provides a method and device for detection of bridge loops in the case of ARP. The present invention also provides a method and device for determining which of two bridging devices to use to reach a device in the shortest number of hops. The present invention also provides a method and device for determining whether or not to respond to an ARP request. The present invention also provides a method and device for filtering out repeat traffic without requiring additional messaging.

A method and device thereof for managing a message received at a bridging device is presented. A bridging device receives a first message comprising a first contact information and a first distance vector representing a number of hops the first message has traversed. The first distance vector is compared to a stored second distance vector corresponding to a stored second contact information for the remote electronic device, wherein the second contact information and second distance vector are provided by a second message. The second distance vector represents a second number of hops the second message has traversed. Provided the first number of hops is greater than the second number of hops, the first message is discarded. Alternatively, provided the first number of hops is not greater than the second number of hops, the second contact information and second distance vector are discarded and the first contact information and first distance vector are stored on a computer-readable memory of the bridging device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "comparing", "storing", "discarding", "managing" or the like, refer to the actions and processes of a computer system, or similar electronic computing device, such as a bridging device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Portions of the present invention are comprised of computer-readable and computer executable instructions which reside, for example, in computer- usable media of a bridging device. It is appreciated that the present invention can be implemented within a computer system in a number of ways, including a hardware device, in firmware or in software.

Figure 1:
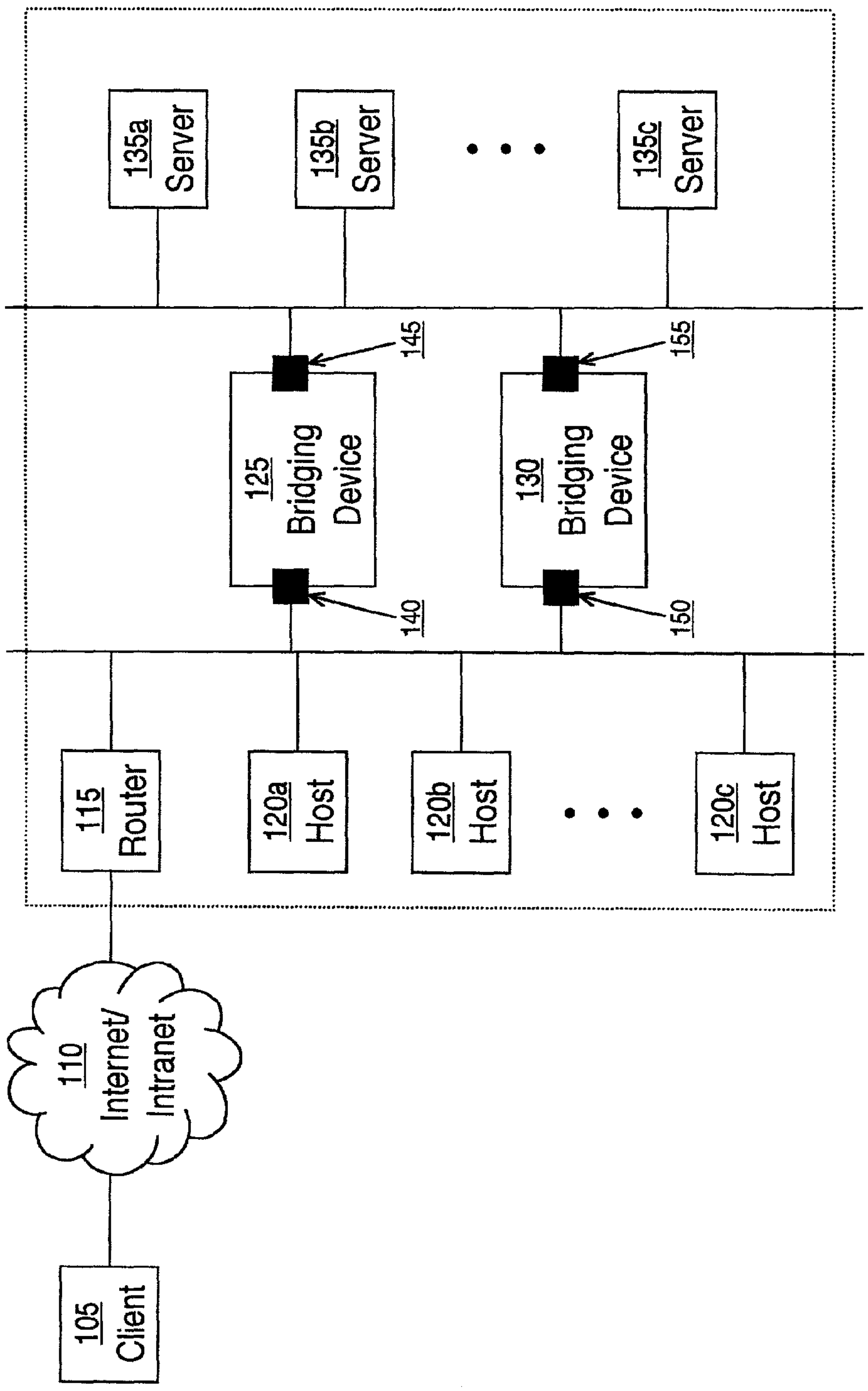
FIG. 1 is a block diagram of a network having a plurality of bridging devices bridging a subnet in accordance with one embodiment of the present invention.

FIG. 1 is a block diagram of a subnet 100 having a plurality of bridging devices bridging for subnet 100 in accordance with one embodiment of the present invention. Subnet 100 is coupled to client device 105 over connection 110. In one embodiment, client device 105 is a computer system. However, it should be appreciated that client device 105 may be any device for transferring and receiving data (e.g., a palmtop computer system). In one embodiment, connection 110 is a connection over a local area network (LAN). It should be appreciated that connection 110 is intended to be any connection for transmitting data (e.g., an Internet connection, an intranet connection, and a connection to another subnet).

Subnet 100 comprises router 115, a plurality of host devices (e.g., hosts 120*a*, 120*b* and 120*c*), a plurality of servers (e.g., servers 135*a*, 135*b*, and 135*c*), and two bridging device (e.g., bridging device 125 and bridging device 130). It should be appreciated that implementations of the present invention are intended to include subnets with a different combination of hosts, servers, routers, and bridging device, and is not intended to be limited to the subnet configuration as described in FIG. 1.

In one embodiment, bridging devices 125 and 130 are operable to bridge subnet 100. Specifically, bridging devices 125 and 130 connect different parts of the same subnet, thereby allowing for expansion of a subnet. Bridging devices 125 and 130 are layer 2 devices, and are configured to handle address resolution protocol (ARP) messages.

ARP is a protocol used to obtain a device's physical address (e.g., a MAC address). A client station (e.g., client device 105) broadcasts an ARP request onto the network with the IP address of the target node (e.g., a server) it wishes to communicate with, and the node with that address responds by sending back its physical address so that packets can be transmitted. ARP returns the layer 2 address for a layer 3 address. ARP requests are broadcast onto the network, requiring every station in the subnet to process the request.

In one embodiment, bridging device 125 is an active bridging device for protocol mapping the locations of connected electronic devices and forwarding data packets across a subnet. Bridging device 125 comprises an interface 140 and an interface 145. Interfaces 140 and 145 are for receiving and transmitting messages.

In one embodiment, bridging device 130 is a standby bridging device. Bridging device 130 performs passive functions, such as protocol mapping of the locations (e.g., MAC addresses) of connected electronic devices. However, bridging device 130 does not forward received data packets to their destination. Bridging device 130 performs protocol mapping so that its data tables will be up to date in the event it is needed to replace bridging device 125 (e.g., bridging device 125 crashes). Bridging device 130 comprises an interface 150 and an interface 155. Interfaces 150 and 155 are for receiving and transmitting messages.

Figure 2:
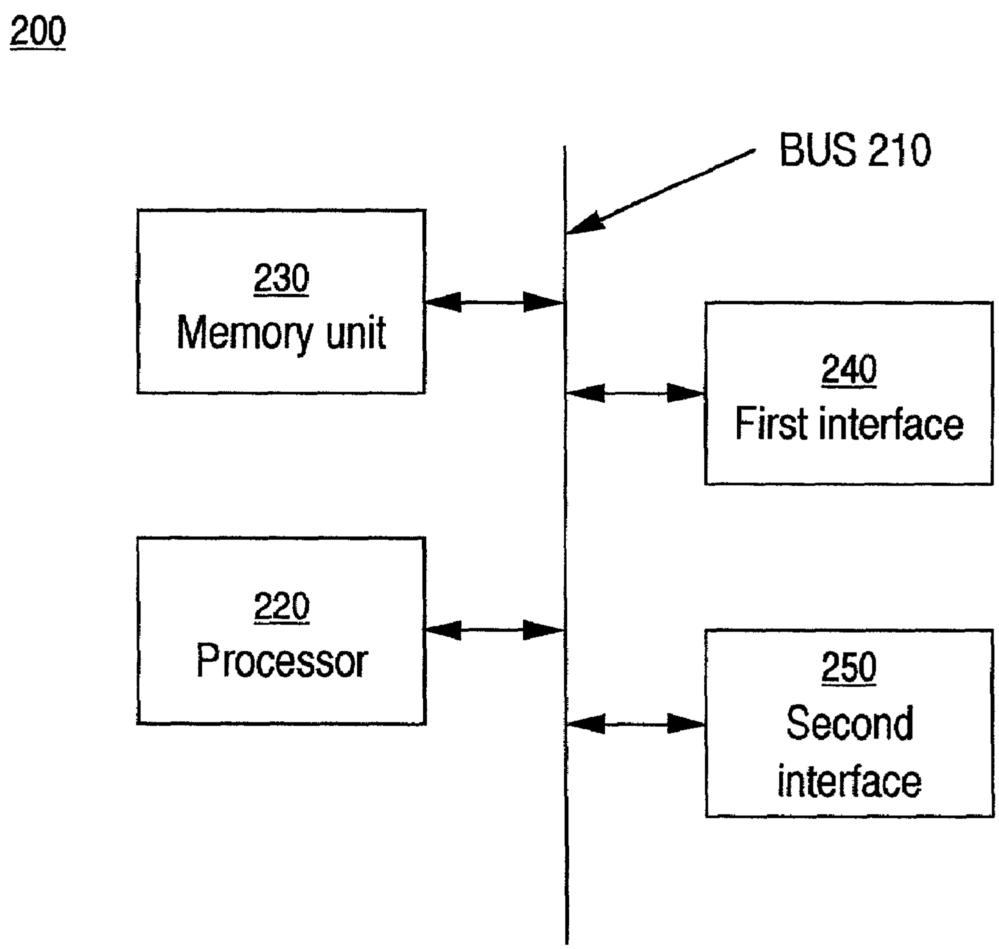
FIG. 2 is a block diagram of a bridging device in accordance with one embodiment of the present invention.

FIG. 2 is a block diagram of a bridging device 200 (e.g., bridging devices 125 and 130 of FIG. 1) in accordance with one embodiment of the present invention. In one embodiment, bridging device 200 is a layer two device operable to handle ARP messages.

Bridging device 200 includes an address/data bus 210 for communicating information, a processor 220 coupled with bus 210 for processing information and instructions and a computer-readable volatile memory unit 230 (e.g., random access memory RAM) coupled with the bus 210 for storing information and instructions for the central processor 101. Bridging device 200 also comprises first interface 240 for receiving and transmitting data and a second interface 250 for receiving and transmitting data.

In one embodiment, stored within computer-readable memory 230 are instructions for executing a process for managing messages received at bridging device 200. In one embodiment, the instructions are for a process for managing messages received at an active bridging device (e.g., process 300 of FIG. 3). In another embodiment, the instructions are for a process for managing messages received at a standby bridging device (e.g., process 400 of FIG. 4).

In one embodiment, bridging device 200 performs protocol mapping of connected electronic devices. Protocol mapping involved tabulating and storing contact information for connected electronic devices. In one embodiment, the stored contact information is the MAC address used to transmit data to the electronic device. In one embodiment, contact information includes which port to transmit data from (e.g., first interface 240 or second interface 250).

Figure 3A:
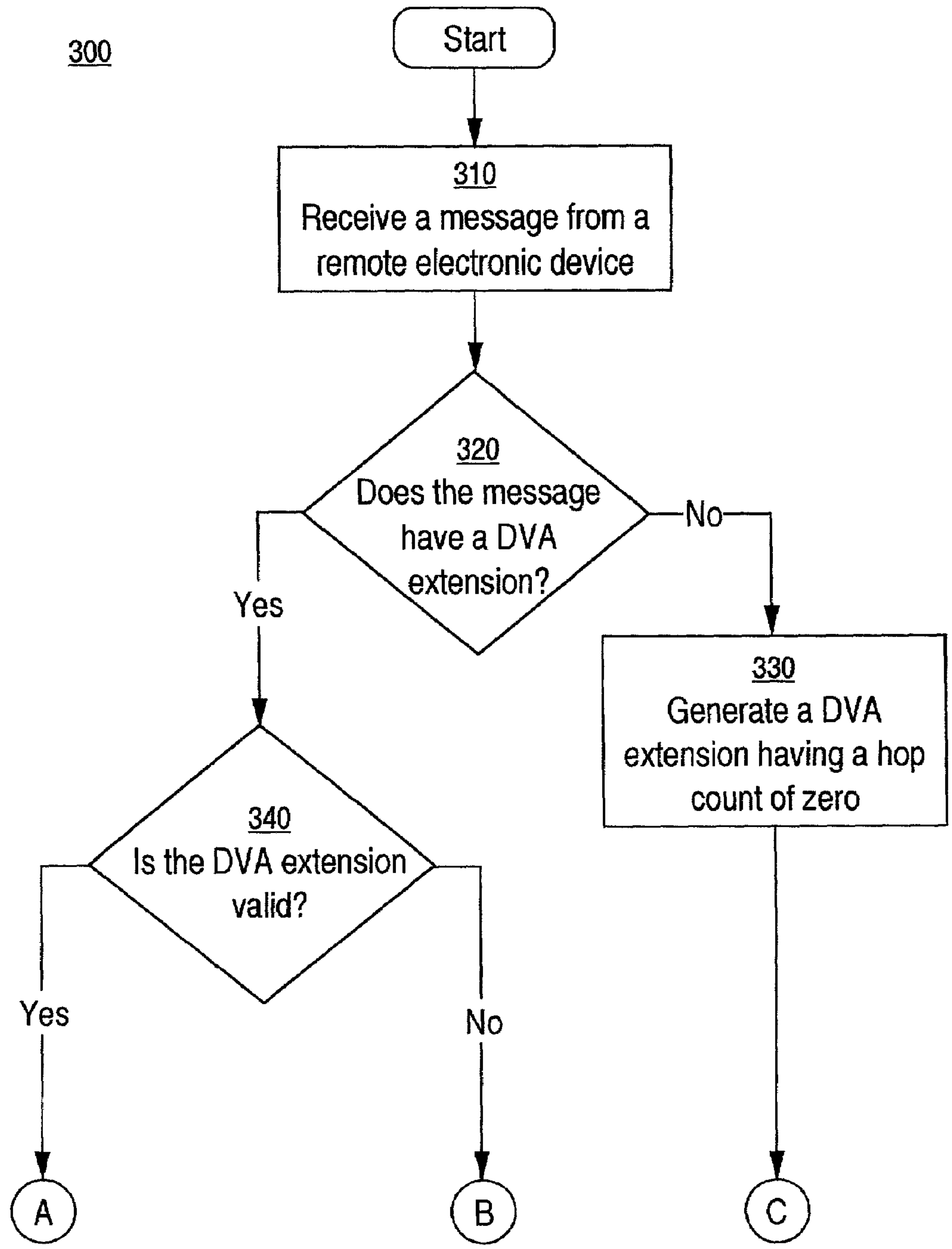
FIGS. 3*a* and 3*b* are flowchart diagrams illustrating a method for managing messages received at an active bridging device in accordance with one embodiment of the present invention.
Figure 3B:
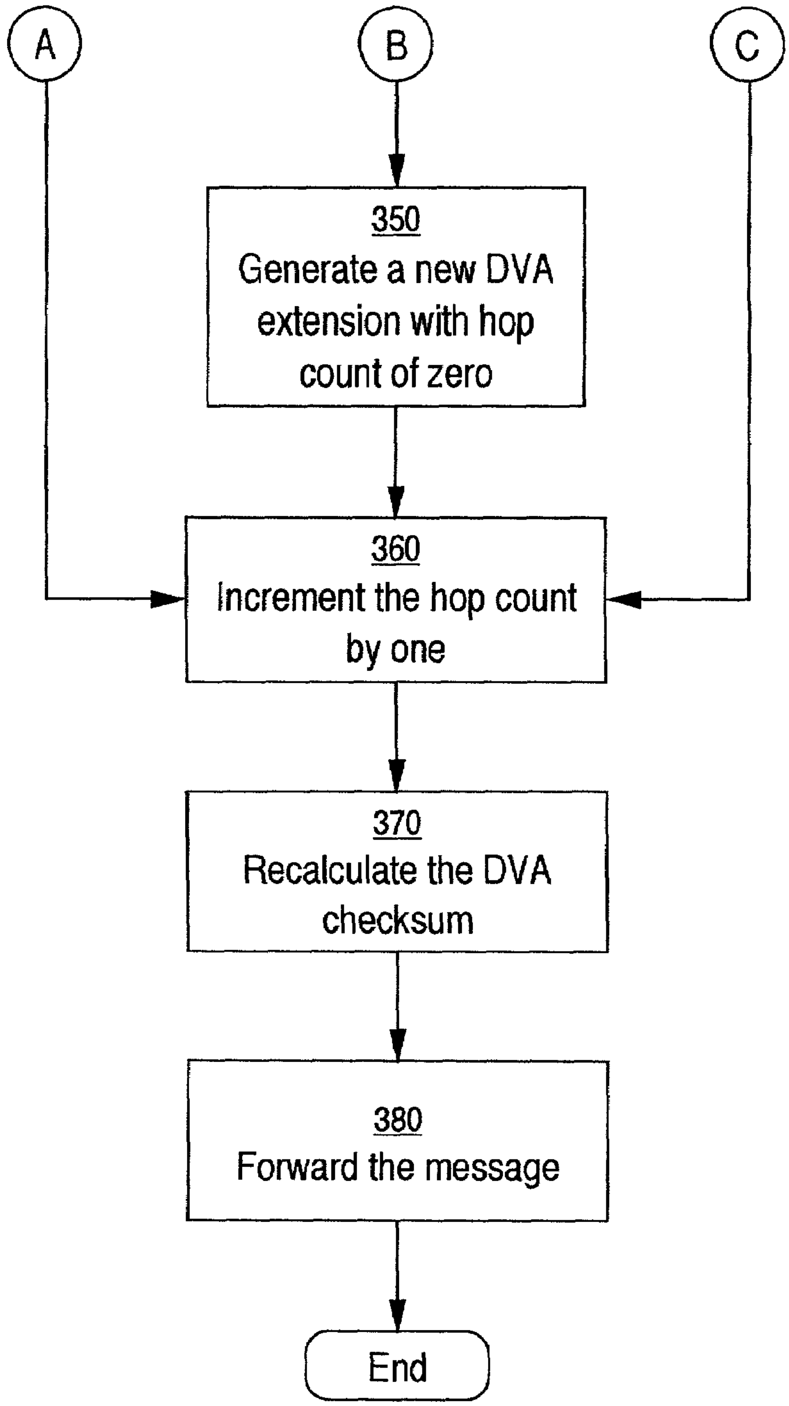

FIGS. 3*a* and 3*b* are flowchart diagrams illustrating a process 300 for managing messages received at an active bridging device in accordance with one embodiment of the present invention. The present invention provides a distance vector ARP (DVA) that uses the available bytes (e.g., pad bytes) at the end of the ARP frame to pass information about the number of hops the ARP message has traversed.

The present invention utilizes the pad bytes of an ARP message in generating a distance vector segment. Standard Ethernet ARP frames are required to be at least 64 bytes long, yet the frame itself is only 42 bytes long, leaving a 22 byte pad. Similarly, 802.1q (VLAN tagged) frames are also required to be at least 64 bytes long, yet are only 46 bytes long, leaving an 18 byte pad. The pad bytes are typically added by 64 byte buffers, and receiving devices only interpret the frame bytes, ignoring the pad bytes. The frame of an ARP message comprises contact information for the electronic device that sent the ARP message (e.g., target IP address and a MAC address).

With reference to FIG. 3*a*, at step 310 of process 300, the bridging device receives an ARP message from a remote electronic device. In one embodiment, the remote electronic device is located in the same subnet as the bridging device. In one embodiment, the message comprises contact information for the remote electronic device. In one embodiment, the contact information is the MAC address of the target for communicating packets to the electronic device. In one embodiment, the bridging device stores the contact information for the electronic device in its memory (e.g., computer-readable volatile memory unit 230 of FIG. 2). In one embodiment, the message is a standard ARP message. In another embodiment, the message is a 802.1q ARP message.

At step 320, it is determined whether the message has a distance vector ARP (DVA) segment. The DVA segment follows the contact information (e.g., target IP address) in the ARP frame. It does not modify the contents of the ARP frame preceding it in any way, thus ensuring backward compatibility. The DVA segment placed in the pad bytes. The DVA comprises a value indicating the number of hops the message has traversed to reach the bridging device.

In one embodiment, the DVA consists of the following:

1. A 4 byte header comprising:
   - A 2 byte checksum for determining the validity the DVA. The checksum operates over the entire ARP frame (including DVA). This is to ensure that DVA portions are not simply copied or garbage data from another frame.
   - A 1 byte identifier for identifying the extension as DVA frame. In one embodiment, the value of is 0xcc.
   - A 1 byte header wherein the first nibble is the total length (in bytes) of the ARP extension and wherein the second nibble is the argument count. In one embodiment, DVA frames have value of 0x61.
2. At least one type-length-value (TLV) segment of variable length (e.g., 2 bytes), wherein the number of segments comes from the argument count in the header, each TLV segment comprising:
   - A 1 byte TLV header wherein the first nibble is the type and the second nibble is the element size in bytes. In one embodiment, the DVA argument has type of 1, size 1, such that the value of the TLV header is 0x11.
   - A value element of the length specified in the preceding TLV header. In one embodiment, a 1 byte value wherein the value is the hop count for the DVA. In one embodiment, the hop count starts at zero for the actual source interface, and is incremented by adding one for each hop (e.g., bridging device) the ARP goes through.

It should be appreciated that the minimum header length is 4 bytes. A header length of zero is invalid and will indicate an error. In one embodiment, header lengths of 4-15 are allowable values.

Provided it is determined that the message does not have a DVA extension, as shown at step 330, a DVA extension is generated. If a bridging device receives a message without a DVA extension, it is assumed that the message was received directly from the source. Thus, the new DVA extension is initialized with a hop count of zero. Process 300 proceeds to step 360 of FIG. 3*b*.

Provided the message is determined to have a DVA extension, as shown at step 340, it is determined whether the DVA extension is valid. The DVA extension may be invalid for a number of reasons. In one embodiment, the DVA extension is invalid due to a violation of rules (e.g., the length of the DVA extension is zero or the identifier is not 0xcc). In another embodiment, the DVA extension is invalid because the checksum is invalid. It should be appreciated that an invalid DVA extension is does not invalidate the entire ARP frame, but only the extension.

It should be appreciated that a checksum process can be used to perform a checksum. In one embodiment, the checksum process is performed according to a standard IP checksum process. It should also be appreciated that the checksum process performed must be the same among all bridging devices of the subnet.

If the DVA extension is determined to be valid, process 300 proceeds to step 360 of FIG. 3*b*. Alternatively, referring to FIG. 3*b*, if the DVA extension is determined to be invalid, as shown at step 350, a new DVA extension is generated. If a bridging device receives a message without a valid DVA extension, it is assumed that the message was received directly from the source. Thus, the new DVA extension is initialized with a hop count of zero. Process 300 then proceeds to step 360.

Referring to FIG. 3*b*, at step 360, the bridging device increments the hop count by one. The hop count indicates the number of proxy hops the message has traversed. Thus, by incrementing the hop count by one, the bridging device indicates that the message has traversed an additional hop.

At step 370, the checksum of the DVA extension is recalculated. As described above, any checksum process may be used to determine the checksum, provided the same process is used among all bridging devices of the subnet. In one embodiment, the checksum process is performed according to a standard IP checksum process.

At step 380, the message is forwarded to the next address. In one embodiment, the message is forwarded to the next MAC address. In one embodiment, the message is received at a standby bridging device.

Figure 4:
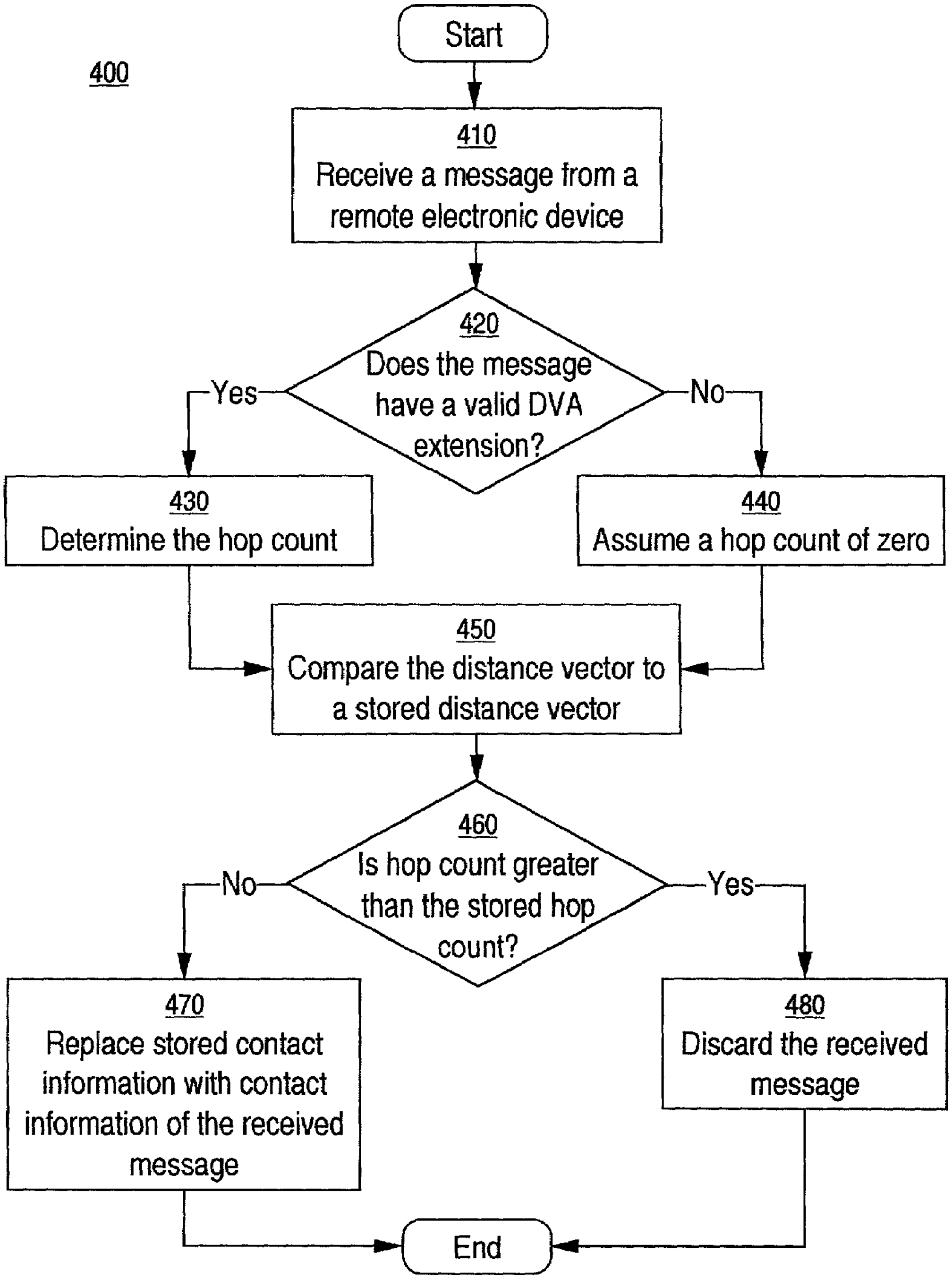
FIG. 4 is a flowchart diagram illustrating a method for managing messages received at a standby bridging device in accordance with one embodiment of the present invention.

FIG. 4 is a flowchart diagram of a process 400 for managing messages received at a standby bridging device in accordance with one embodiment of the present invention. In one embodiment, the standby device is operating as a hot standby device, such that it is performing passive functions (e.g., protocol mapping). As described above, the present invention provides a distance vector ARP (DVA) that uses the available bytes (e.g., pad bytes) at the end of the ARP frame to pass information about the number of proxy hops the ARP message has traversed.

At step 410 of process 400, the standby bridging device receives an ARP message from a remote electronic device. In one embodiment, the remote electronic device is located in the same subnet as the bridging device. It should be appreciated that the remote electronic device may be another bridging device, as well as any other node device (e.g., a host or a server).

In one embodiment, the message comprises contact information for the remote electronic device. In one embodiment, the contact information is the MAC address of the target for communicating packets to the electronic device. In one embodiment, the message is a standard ARP message. In another embodiment, the message is a 802.1q ARP message.

At step 420, it is determined whether the message has a distance vector ARP (DVA) segment. The DVA segment follows the target IP address in the ARP frame. It does not modify the contents of the ARP frame preceding it in any way, thus ensuring backward compatibility. The DVA comprises of the number of hops the message has traversed to reach the bridging device. It should be appreciated that in one embodiment, the DVA consists of the elements as recited at step 320 of process 300 (FIG. 3*a*).

The DVA extension may be invalid for a number of reasons. In one embodiment, the ARP message has not been received at a previous bridging device, thus no DVA extension has been generated. In another embodiment, the DVA extension is invalid due to a violation of rules (e.g., the length of the DVA extension is zero or the identifier is not 0xcc). In another embodiment, the DVA extension is invalid because the checksum is invalid. It should be appreciated that an invalid DVA extension is does not invalidate the entire ARP frame, but only the extension.

Provided the message is determined to have a valid DVA extension, as shown at step 430, the standby bridging device determines the hop count. The hop count indicates the number of proxy hops the message has traversed.

Alternatively, provided it is determined that the message does not have a valid DVA extension, as shown at step 440, it is assumed that the message was received directly from the source. Thus, the hop count is assumed to be zero. This allows DVA-enabled bridging devices to operate in a subnet having electronic devices that are not DVA-enabled.

At step 450, the hop count of the DVA extension is compared to the hop count corresponding to stored contact information for the remote electronic device. It should be appreciated that the one remote electronic device can have more than one contact information (e.g., MAC address). The stored contact information is located in the memory of the standby bridging device (e.g., computer-readable volatile memory unit 230).

At step 460, it is determined whether the received hop count is greater than the stored hop count. If the received hop count is not greater than the stored hop count for the remote electronic device, as shown at step 470, the stored contact information is discarded, and the received contact information is stored in memory. In one embodiment, the contact information is a MAC address.

If the received hop count is greater than the stored hop, as shown at step 480, the received message is discarded.

The present invention provides a method and device for detection of bridge loops in the case of ARP. The present invention also provides a method and device for determining which of two bridging devices to use to reach a device in the shortest number of hops. The present invention also provides a method and device for determining whether or not to respond to an ARP request. The present invention also provides a method and device for filtering out repeat traffic without requiring additional messaging.

The preferred embodiment of the present invention, a distance vector extension of the address resolution protocol, is thus described. While the present invention has been described in particular embodiments, it should be appreciated that the present invention should not be construed as limited by such embodiments, but rather construed according to the below claims.

What is claimed is:

1. A method for managing an Address Resolution Protocol (ARP) message received at a bridging device, said bridging device for bridging a subnet, said method comprising:

receiving a first message comprised within an ARP frame, said first message comprising a first contact information for a remote electronic device and a first distance vector representing a first number of hops said first message has traversed;

comparing said first distance vector to a stored second distance vector corresponding to a stored second contact information for said remote electronic device, said second contact information and said second distance vector provided by a second message comprised within an ARP frame, said second distance vector representing a second number of hops said second message has traversed; and storing a message based on results of said comparing.

2. A method as recited in claim 1, wherein said storing said message based on results of said comparing further comprises:

provided said first number of hops is greater than said second number of hops, discarding said first message; and provided said first number of hops is not greater than said second number of hops, discarding said second contact information and said second distance vector and storing said first contact information and said first distance vector.

3. A method as recited in claim 1 wherein a computer-readable memory of said bridging device is configured for storing said first contact information, said first distance vector, said second contact information and said second distance vector.

4. A method as recited in claim 1 wherein said bridging device is operating as a standby bridging device.

5. A method as recited in claim 1 wherein said first distance vector is transmitted in pad bytes of said first message and said second distance vector is transmitted in pad bytes of said second message.

6. A method as recited in claim 1 wherein said first message is received from a remote bridging device, wherein upon forwarding said first message, said remote bridging device increments said first number of hops by one.

7. A method as recited in claim 1 wherein said first distance vector comprises:

a checksum for determining the validity of said first distance vector;

an identifier for identifying said first distance vector; and a value representing said first number of hops.

8. A method as recited at claim 1 wherein said first message and said second message are standard Ethernet ARP messages.

9. A method as recited at claim 1 wherein said first message and said second message are 802.1q ARP messages.

10. An bridging device comprising:

a bus;

an interface coupled to said bus for receiving an external message from a second electronic device;

a computer-readable memory coupled to said bus; and a processor coupled to said bus, said processor for executing a method for managing Address Resolution Protocol (ARP) messages received at said bridging device, said method comprising:

receiving a first message comprised within an ARP frame, said first message comprising a first contact information for a remote electronic device and a first distance vector representing a first number of hops said first message has traversed;

comparing said first distance vector to a stored second distance vector corresponding to a stored second contact information for said remote electronic device, said second contact information and said second distance vector provided by a second message comprised within an ARP frame, said second distance vector representing a second number of hops said second message has traversed; and storing a message based on results of said comparing.

11. An bridging device as recited in claim 10, wherein said storing said message based on results of said comparing further comprises:

provided said first number of hops is greater than said second number of hops, discarding said first message; and provided said first number of hops is not greater than said second number of hops, discarding said second contact information and said second distance vector and storing said first contact information and said first distance vector.

12. An bridging device as recited in claim 10 wherein said computer-readable memory is configured for storing said first contact information, said first distance vector, said second contact information and said second distance vector.

13. An bridging device as recited in claim 10 wherein said bridging device is operating as a standby bridging device.

14. An bridging device as recited in claim 10 wherein said first distance vector is transmitted in pad bytes of said first message and said second distance vector is transmitted in pad bytes of said second message.

15. An bridging device as recited in claim 10 wherein said first message is received from a remote bridging device, wherein upon forwarding said first message, said remote bridging device increments said first number of hops by one.

16. An bridging device as recited in claim 10 wherein said first distance vector comprises:

a checksum for determining the validity of said first distance vector;

an identifier for identifying said first distance vector; and a value representing said first number of hops.

17. An bridging device as recited at claim 10 wherein said first message and said second message are standard Ethernet ARP messages.

18. An bridging device as recited at claim 10 wherein said first message and said second message are 802.1q ARP messages.

19. A computer-readable medium having computer-readable program code embodied therein for causing a computer system to perform a method for managing Address Resolution Protocol (ARP) messages received at a bridging device, said method comprising:

receiving a first message comprised within an ARP frame, said first message comprising a first contact information for a remote electronic device and a first distance vector representing a first number of hops said first message has traversed;

comparing said first distance vector to a stored second distance vector corresponding to a stored second contact information for said remote electronic device, said second contact information and said second distance vector provided by a second message comprised within an ARP frame, said second distance vector representing a second number of hops said second message has traversed; and storing a message based on results of said comparing.

20. A computer-readable medium as recited in claim 19, wherein said storing said message based on results of said comparing further comprises:

provided said first number of hops is greater than said second number of hops, discarding said first message; and provided said first number of hops is not greater than said second number of hops, discarding said second contact information and said second distance vector and storing said first contact information and said first distance vector.

21. A computer-readable medium as recited in claim 19 wherein a computer-readable memory of said bridging device is configured for storing said first contact information, said first distance vector, said second contact information and said second distance vector.

22. A computer-readable medium as recited in claim 19 wherein said bridging device is operating as a standby bridging device.

23. A computer-readable medium as recited in claim 19 wherein said first distance vector is transmitted in pad bytes of said first message and said second distance vector is transmitted in pad bytes of said second message.

24. A computer-readable medium as recited in claim 19 wherein said first message is received from a remote bridging device, wherein upon forwarding said first message, said remote bridging device increments said first number of hops by one.

25. A computer-readable medium as recited in claim 19 wherein said first distance vector comprises:

a checksum for determining the validity of said first distance vector;

an identifier for identifying said first distance vector; and a value representing said first number of hops.

26. A computer-readable medium as recited at claim 19 wherein said first message and said second message are standard Ethernet ARP messages.

27. A computer-readable medium as recited at claim 19 wherein said first message and said second message are 802.1q ARP messages.

* * * * *